(12) United States Patent
Yang et al.

(10) Patent No.: US 8,918,476 B2
(45) Date of Patent: Dec. 23, 2014

(54) METHOD FOR PAGE REDIRECTION AND WAP GATEWAY

(71) Applicant: Huawei Technologies Co., Ltd., Shenzhen, Guangdong (CN)

(72) Inventors: Zanfeng Yang, Shenzhen (CN); Xuri Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 13/731,360

(22) Filed: Dec. 31, 2012

(65) Prior Publication Data
US 2013/0124678 A1  May 16, 2013

Related U.S. Application Data

(63) Continuation of application No. 12/779,851, filed on May 13, 2010, which is a continuation of application No. PCT/CN2008/073035, filed on Nov. 12, 2008.

(30) Foreign Application Priority Data

Nov. 13, 2007 (CN) .......................... 2007 1 0124514

(51) Int. Cl.
G06F 15/16 (2006.01)
H04L 12/54 (2013.01)
H04L 12/66 (2006.01)
H04L 29/08 (2006.01)

(52) U.S. Cl.
CPC ............ *H04L 12/5689* (2013.01); *H04L 12/66* (2013.01); *H04L 67/2814* (2013.01); *H04L 67/2828* (2013.01); *H04L 67/04* (2013.01)
USPC .......................................... 709/217; 709/229

(58) Field of Classification Search
USPC ........................................................ 709/217
See application file for complete search history.

(56) References Cited

U.S. PATENT DOCUMENTS 6,775,687 B1  8/2004  Binding et al.
7,136,930 B1  11/2006  Leppinen
(Continued)

FOREIGN PATENT DOCUMENTS

CN          1326156 A      12/2001
CN        101197843 A       6/2008
(Continued)

OTHER PUBLICATIONS

Chinese office action for Chinese application No. 200710124514.8, dated Jan. 15, 2010, and an English translation thereof, total 18 pages.

(Continued)

*Primary Examiner* — Hua Fan

(57) ABSTRACT

The present disclosure relates to the field of communications, and discloses a method for page redirection and a WAP gateway, which reduces the time delay the terminal experiences when acquiring pages. In the present disclosure, the WAP gateway requests, when receiving a page request from a user terminal, a page requested by the user terminal from a service provider; and when a page returned by the service provider satisfies a page redirection criterion, the WAP gateway performs a page redirection, and returns the page obtained after the redirection to the user terminal. The page redirection criterion is that the page contains redirection serial status codes indicating that a redirection is needed, or that the page contains an "onenterforward" mark. The WAP gateway retains the "Cookie" information included in the page returned by the service provider.

16 Claims, 6 Drawing Sheets

(56) References Cited

U.S. PATENT DOCUMENTS

| | | |
|---|---|---|
| 7,406,498 B2 | 7/2008 | Reshef et al. |
| 7,831,712 B1 | 11/2010 | Masters |
| 2002/0046299 A1* | 4/2002 | Lefeber et al. ............... 709/318 |
| 2003/0154446 A1* | 8/2003 | Constant et al. ............. 715/531 |
| 2003/0185197 A1* | 10/2003 | Banerjee et al. ............. 370/351 |
| 2004/0187076 A1 | 9/2004 | Ki et al. |
| 2005/0060410 A1 | 3/2005 | Wu et al. |
| 2007/0061339 A1* | 3/2007 | Douglet et al. ................ 707/10 |
| 2007/0088801 A1* | 4/2007 | Levkovitz et al. ............ 709/217 |
| 2008/0046449 A1* | 2/2008 | Lee et al. ..................... 707/100 |
| 2008/0281900 A1 | 11/2008 | Boulia |

FOREIGN PATENT DOCUMENTS

| | | |
|---|---|---|
| KR | 20070107882 A | 11/2007 |
| WO | 0184368 A2 | 11/2001 |
| WO | 0246948 A1 | 6/2002 |
| WO | 2009067926 A1 | 6/2009 |

OTHER PUBLICATIONS

Written Opinion of the International Searching Authority in corresponding PCT Application No. PCT/CN2008/073035, Feb. 5, 2009, total 8 pages.

Russia office action for Russia application No. RU2010123939, dated Jul. 8, 2011, and an English translation thereof, total 6 pages.

European Search Report for European Patent Application No. 08853781.6, dated Jan. 18, 2011, total 5 pages.

International search report for International application No. PCT/CN2008/073035, dated Feb. 5, 2009, total 8 pages.

European office action for European Patent Application No. 08853781.6, dated Nov. 11, 2011, total 4 pages.

First office action issued in corresponding U.S. Appl. No. 12/779,851, dated Feb. 17, 2012, total 25 pages.

Second office action issued in corresponding U.S. Appl. No. 12/779,851, dated Dec. 13, 2012, total 23 pages.

\* cited by examiner

METHOD FOR PAGE REDIRECTION AND WAP GATEWAY

CROSS-REFERENCE TO RELATED APPLICATION

This application is a continuation of U.S. patent application Ser. No. 12/779,851, filed on May 13, 2010, which is a continuation of International Application No. PCT/CN2008/073035, filed on Nov. 12, 2008. The International Application claims priority to Chinese Patent Application No. 200710124514.8, filed on Nov. 13, 2007. The afore-mentioned patent applications are hereby incorporated by reference in their entireties.

FIELD OF THE INVENTION

The present disclosure relates to the field of communications, and more particularly to the technology for page redirection.

BACKGROUND OF THE INVENTION

With the increasing demand of a user on the mobile communications, it is necessary for a mobile network to launch more and more new services so as to satisfy various demands of the user. In recent years, new services of the mobile network have continually emerged, including data communications and facsimile, Chinese and English short message service, international roaming, mobile-phone stock exchange, dual-band networks, virtual private networks, secretary services, Wireless Application Protocol (WAP), mobile-phone banking, etc. Through these new services, the user may increasingly experience the applicability and entertainment brought by the technology of mobile communications.

At present, the web browsing is a service widely utilized. A user terminal can initiate a page request to a WAP gateway through a wireless interface. According to a Uniform Resource Locator (URL) in the page request, the WAP gateway requests the page requested by the user terminal from a Service Provider (SP), and returns the page obtained from the SP to the user terminal.

The position of the page requested by the user terminal may change, for example, the page requested by the user terminal was originally located in a server A, but now is redirected to a server B. Therefore, at this time, the user terminal needs to perform a page redirection to acquire the desired page.

Specifically, the user terminal initiates the page request to the WAP gateway through the wireless interface, the request carrying the URL information, where the URL information is about the page when the page is located in the server A. According to the URL information, the WAP gateway acquires the page corresponding to the URL information from the server A of the SP, and directly returns the page to the user terminal. If the desired page of the user terminal has been changed from the server A to the server B, the page acquired by the user terminal from the server A may contain redirection information, requiring the user terminal to reacquire the page from the server B. According to the redirection information, the user terminal performs the page redirection so as to acquire the desired page.

However, the inventor of the present disclosure has found that according to the conventional art, the time delay from the initiation of the request by the user terminal to the acquisition of the final page is pretty long. This is because there could be more multiple redirections for the page accessed by the user terminal. That is, multiple redirection interaction operations are needed between the user terminal and the SP, while the wireless interface transmission between the user terminal and the WAP gateway needs a longer time delay. Therefore, multiple redirections between the user terminal and the SP make the time delay from the initiation of the request by the user terminal to the acquisition of the final page relatively long.

By observing through the CDS software, the time delay for the user terminal to acquire the final page is related to the number of times of redirection: the more the number of times of redirection, the longer the time delay. For example, the total time from requesting "house and car*people forum" by the user terminal to acquiring the page is 8.3 s, where four redirections take 5 s and each redirection approximately takes about is, and displaying the contents on the page of "house and car*people forum" takes 3 s. As such, the operation of multiple redirections is the main reason for effecting page refreshment.

BRIEF SUMMARY OF THE INVENTION

The main technical problem to be solved by an embodiment of the present disclosure is to provide a method for page redirection and to provide a WAP gateway, which reduces the time delay the terminal may experience when acquiring pages.

To solve the above technical problem, an embodiment of present disclosure provides a method for page redirection, including: requesting, by a WAP gateway, a page requested by a user terminal from a service provider when receiving the page request from the user terminal; and when a page returned by the service provider satisfies a page redirection criterion, performing, by the WAP gateway, a page redirection, and returning the page obtained after the redirection to the user terminal.

An embodiment of the present disclosure further provides a WAP gateway, including: a requesting module, configured to request, when receiving a page request from a user terminal, a page requested by the user terminal from a service provider, and configured to receive a page returned by the service provider; a first determining module, configured to determine, after the requesting module receives the page returned by the service provider, whether the page returned by the service provider satisfies the page redirection criterion; a redirecting module, configured to perform a page redirection when the first determining module determines that the page returned by the service provider satisfies the page redirection criterion; and a sending module, configured to return the page obtained after the redirection by the redirecting module to the user terminal.

The WAP gateway requests, when receiving the page request from the user terminal, the page requested by the user terminal from the SP, and when the page returned by the SP satisfies the page redirection criterion, the WAP gateway rather than the user terminal performs the page redirection, and returns the page obtained after the redirection to the user terminal. When the page requested by the user terminal needs to be redirected, the WAP gateway will perform the page redirection, rather than the user terminal initiating the page redirection. Such configuration may reduce the occupation of Um Interface resource between the WAP gateway and the user terminal, thereby reducing the time delay the terminal experiences when acquiring pages, so as to increase the customer satisfaction and to improve the efficiency of refreshing pages. Moreover, because the page redirection initiated by the user terminal needs to use a wireless network bandwidth and it is necessary for the user terminal to have the function of the page redirection, the page redirection performed by the WAP gateway rather than the user terminal can further reduce the use of the wireless network bandwidth, so as to lower the mobile comprehensive purchase cost, reduce the dependence on the user terminal and decrease complaints from the user.

BRIEF DESCRIPTION OF THE DRAWINGS

In order to more clearly describe the embodiments of the present disclosure or the technical solution in the conventional art, a brief introduction is given below with respect to the drawings to be used in the embodiments or the conventional art. Obviously, the drawings in the following description are only some embodiments of the present disclosure. For persons skilled in the art, other drawings can be obtained according to these drawings without creative effort.

DETAILED DESCRIPTION OF THE INVENTION

In order to render the objects, the technical solution and advantages of the present disclosure clearer, the embodiments of the present disclosure are further described in detail with respect to the drawings.

Figure 1:
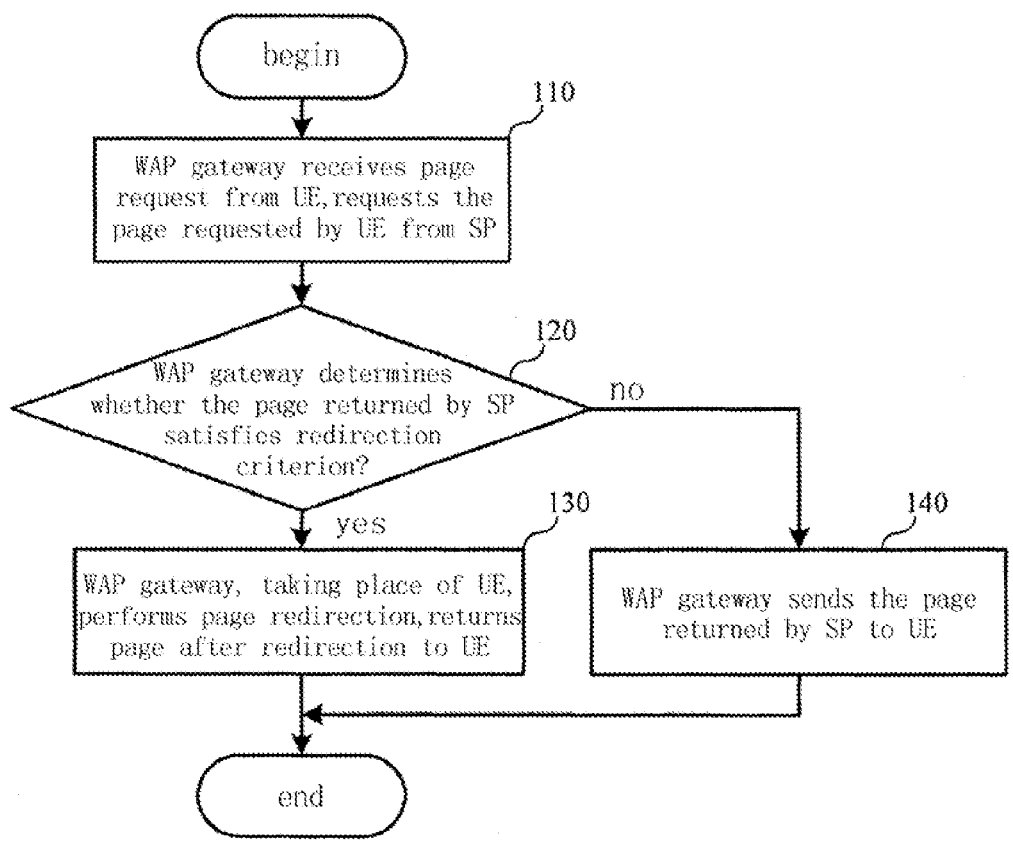
FIG. 1 is a schematic diagram illustrating the flow of a method for page redirection according to an embodiment of the present disclosure.

FIG. 1 is a schematic diagram illustrating the flow of a method for page redirection according to an embodiment of the present disclosure. According to this embodiment, the WAP gateway requests, when receiving the page request from the user terminal, the page requested by the user terminal from the SP. When the page returned by the SP satisfies the page redirection criterion, the WAP gateway, taking the place of the user terminal, performs the page redirection, and returns the page obtained after the redirection to the user terminal.

In step 110, the WAP gateway receives the page request from the user terminal, and requests the page requested by the user terminal from the SP according to the page request of the user terminal.

Specifically, when it needs to access a certain page, the user terminal sends the page request for this page to the WAP gateway through a wireless interface. After receiving the page request, the WAP gateway requests, according to URL information carried in the request, the page requested by the user terminal from the SP.

In step 120, the WAP gateway determines whether the page returned by the SP satisfies the page redirection criterion, and if the page satisfies the page redirection criterion, the process proceeds to step 130; if the page does not satisfy the page redirection criterion, the process proceeds to step 140.

Specifically, after the WAP gateway requests the page from the SP according to the URL information carried in the page request of the user terminal, the SP returns the page corresponding to the URL information to the WAP gateway. The WAP gateway parses the page returned by the SP, and if the page returned by the SP satisfies the page redirection criterion, it indicates that the page for which the user terminal expects to acquire is no longer located in the original server, and that the page redirection is needed; if the page returned by the SP does not satisfy the page redirection criterion, it indicates that the page for which the user terminal expects to acquire is still located in the original server, and that the page returned by the SP is the desired page of the user terminal. Here the page redirection criterion may be that the page contains the redirection serial status codes indicating that a redirection is needed, or that the page contains an "onenterforward" mark. As for general pages, if the status codes are redirection serial status codes, it indicates that the redirection is needed for the page; as for Wireless Markup Language (WML) pages, if the page contains the "onenterforward" mark, it indicates that the redirection is needed for the page. Therefore, the criteria for determining the redirection according to the embodiment are applicable not only for general pages but also for WML pages.

For example, the page returned by the SP contains redirection serial status codes such as 300, 301, 302, 303, 305 and 307, or the page returned by the SP is the WML page which contains the "onenterforward" mark. At this time, the WAP gateway determines that the page returned by the SP satisfies the page redirection criterion, and that the page redirection is needed, that is to proceed to step 130. If the page returned by the SP is the WML page but the page does not contain the "onenterforward" mark, or if the page returned by the SP is not the WML page and the page does not contain redirection serial status codes (such as 300, 301, 302, 303, 305 and 307), the WAP gateway determines that the page returned by the SP does not satisfy the page redirection criterion, and that the page redirection is not needed, that is to proceed to step 140.

In step 130, after determining that the page returned by the SP satisfies the page redirection criterion and that the page redirection is needed, the WAP gateway, taking the place of the user terminal, performs the page redirection, and returns the page obtained after the redirection to the user terminal. The WAP gateway may perform the page redirection according to redirection information carried in the page returned by the SP which satisfies the page redirection criterion, and returns the page obtained after the redirection to the user terminal.

When the page requested by the user terminal needs to be redirected, the WAP gateway will perform the page redirection, rather than the user terminal initiating the page redirection. Such configuration may reduce air interface interaction between the WAP gateway and the user terminal, thereby reducing the time delay the terminal experiences when acquiring pages, so as to increase the customer satisfaction and to improve the efficiency of refreshing pages. Moreover, because the page redirection initiated by the user terminal needs to use a wireless network bandwidth and it is necessary for the user terminal to have the function of the page redirection, the page redirection performed by the WAP gateway rather than the user terminal can further reduce the use of the wireless network bandwidth, so as to lower the mobile comprehensive purchase cost, reduce the dependence on the user terminal and decrease complaints from the user.

In step 140, after determining that the page returned by the SP does not satisfy the page redirection criterion and that the page redirection is not needed, the WAP gateway directly sends the page returned by the SP to the user terminal, so that the user terminal may acquire the desired page.

Figure 2:
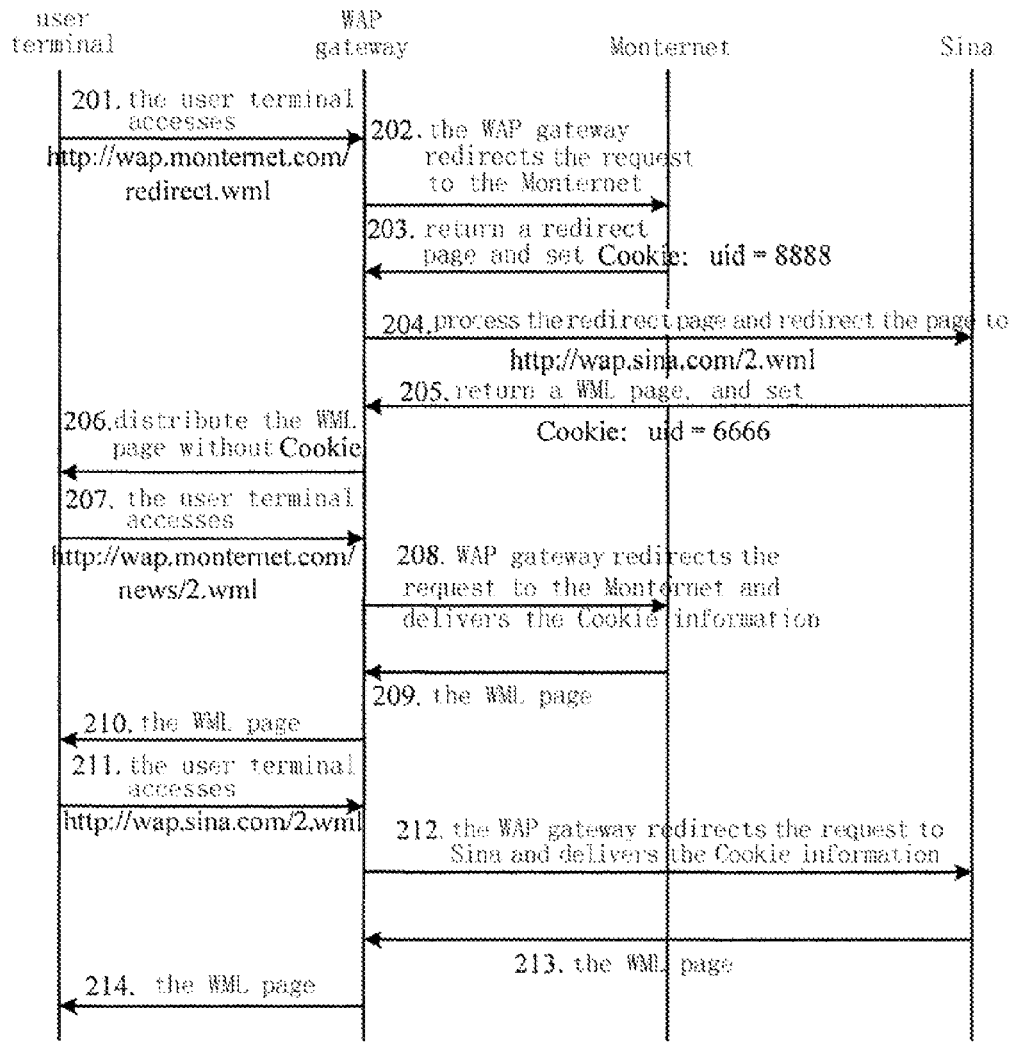
FIG. 2 is a schematic diagram illustrating a specific flow of a method for page redirection according to an embodiment of the present disclosure.

FIG. 2 is a schematic diagram illustrating a specific flow of a method for page redirection according to an embodiment of the present disclosure. This embodiment is an implementation of the embodiment as shown in FIG. 1. According to this embodiment, the WAP gateway further needs to retain "Cookie" information included in the page returned by the SP.

In step 201, the user terminal initiates the page request to the WAP gateway, the URL of the page requested to be accessed is http://wap.monternet.com/redirect.wml.

In step 202, after the WAP gateway receives the page request, it can be aware that according to URL information in the request, the page requested by the user terminal is in the Monternet. Therefore, the request is forwarded to the Monternet, to request acquisition of the page requested by the user terminal.

In step 203, the Monternet returns the redirected page, and sets the Cookie as uid=8888. After the Monternet receives the page request forwarded by the WAP gateway, it can be aware that the page for which the user terminal expects to acquire has been changed into Sina. Hence, the Monternet returns the redirect page to the WAP gateway, where the redirect page contains the information which needs to be redirected to http://wap.sina.com/2.wml as well as the "Cookie" information (uid=8888) of the redirect page.

In step 204, after receiving the redirect page, the WAP gateway processes the redirect page. Specifically, after the WAP gateway receives the redirect page, by parsing the redirect page it can be aware that the page satisfies the page redirection criterion and needs to be redirected to http://wap.sina.com/2.wml. Therefore, the WAP gateway, taking the place of the user terminal, performs the page redirection, and redirects the page to http://wap.sina.com/2.wml. In addition, because the redirected page contains the "Cookie" information (uid=8888), the WAP gateway further needs to retain the "Cookie" information.

In step 205, Sina returns the WML page to the WAP gateway, and sets Cookie as uid=6666.

In step 206, after receiving the WML page returned by Sina, the WAP gateway returns the WML page to the user terminal, and retains the "Cookie" information (uid=6666) in the WML page. The WAP2.0 type user terminal may support the WML page, while the WAP1.x type user terminal does not support the WML page. Therefore, if the user terminal initiating the page request is a type of WAP1.x, the WAP gateway may choose not to distribute the WML page to the user terminal.

According to this embodiment, the WAP gateway retains the "Cookie" information included in the page returned by the SP. Therefore, when the WAP gateway needs to request the acquired page from the SP, the requested page can be successfully acquired according to the retained "Cookie" information. The specific flow will be described by the following steps 207-214.

In step 207, the user terminal initiates the page request to the WAP gateway, the URL of the page requested to be accessed is http://wap.monternet.com/news/2.wml.

In step 208, after the WAP gateway receives the page request, according to the URL information in the request it can be aware that the page requested by the user terminal is in the Monternet. Therefore, the request is forwarded to the Monternet, to request acquisition of the page requested by the user terminal. According to the URL information in the request, the WAP gateway can further inquire the retained "Cookie" information (uid=8888). Therefore, while forwarding the page request, the WAP gateway further needs to send the "Cookie" information (uid=8888) to the Monternet.

In step 209, the Monternet obtains the correct Cookie: uid=8888 in the request forwarded by the WAP gateway, makes successful access, and returns the WML page to the WAP gateway.

In step 210, the WAP gateway distributes the WML page returned by the Monternet to the user terminal.

In step 211, the user terminal initiates the page request to the WAP gateway, the URL of the page requested to be accessed is http://wap.sina.com/2.wml.

In step 212, after the WAP gateway receives the page request, according to the URL information in the request it can be aware that the page requested by the user terminal is in Sina. Therefore, the request is forwarded to Sina, to request acquisition of the page requested by the user terminal. Because the WAP gateway can further inquire the retained "Cookie" information (uid=6666) according to the URL information in the request, the WAP gateway further needs to send the "Cookie" information (uid=6666) to Sina while forwarding the page request.

In step 213, Sina obtains the correct Cookie: uid=6666 in the request forwarded by the WAP gateway, makes successful access, and returns the WML page to the WAP gateway.

In step 214, the WAP gateway distributes the WML page returned by Sina to the user terminal.

It can be easily seen that steps 207-210 describe the flow of the user terminal accessing the page with URL as http://wap.monternet.com/news/2.wml; steps 211-214 describe the flow of the user terminal accessing the page with URL as http://wap.sina.com/2.wml. There does not exist an explicit precedence relationship between the two flows. The WAP gateway successfully acquires the pages from the SP through the retained "Cookie" information and distributes them to the user terminal.

The HTTP protocol is a stateless protocol, so the "Cookie" information plays the role of managing session status correspondingly. In many cases, the SP determines whether the request of the user is valid or not according to the "Cookie" information. For example, if a certain user terminal accesses a website (such as Monternet), the SP will first set a Cookie for the user terminal. Within the period of validity of the Cookie the user terminal needs to carry the Cookie when accessing other catalogues or files in the website; otherwise, the page stays on the home page all the time and the user terminal cannot enter any subsequent directory. Moreover, some websites can set some personalized pages (such as language settings) for a certain user terminal. If the user terminal needs to access the website again within the period of validity of the Cookie, the user terminal can re-access the website according to the "Cookie" information, with no need of resetting the page.

In addition, some websites may require the user to input an account ID, a password, and so on in access. Upon input, the websites may set a Cookie for the user, so that when accessing the website within the period of validation of the Cookie again, the user does not need to again input the account ID, the password and so on.

According to this embodiment, the "Cookie" information is processed by the WAP gateway, so as to prevent the user terminal from taking the Cookie of http://wap.monternet.com/redirect.wml as UID=6666 by mistake (UID=6666 is actually the Cookie of http://wap.sina.com), which may lead to an error of access.

Moreover, the "Cookie" information of webpage retained by the WAP gateway is with respect to one terminal. Therefore, there is a plurality of ways in implementation, for example, the "Cookie" information is retained in a memory or a data base, etc.

Figure 3:
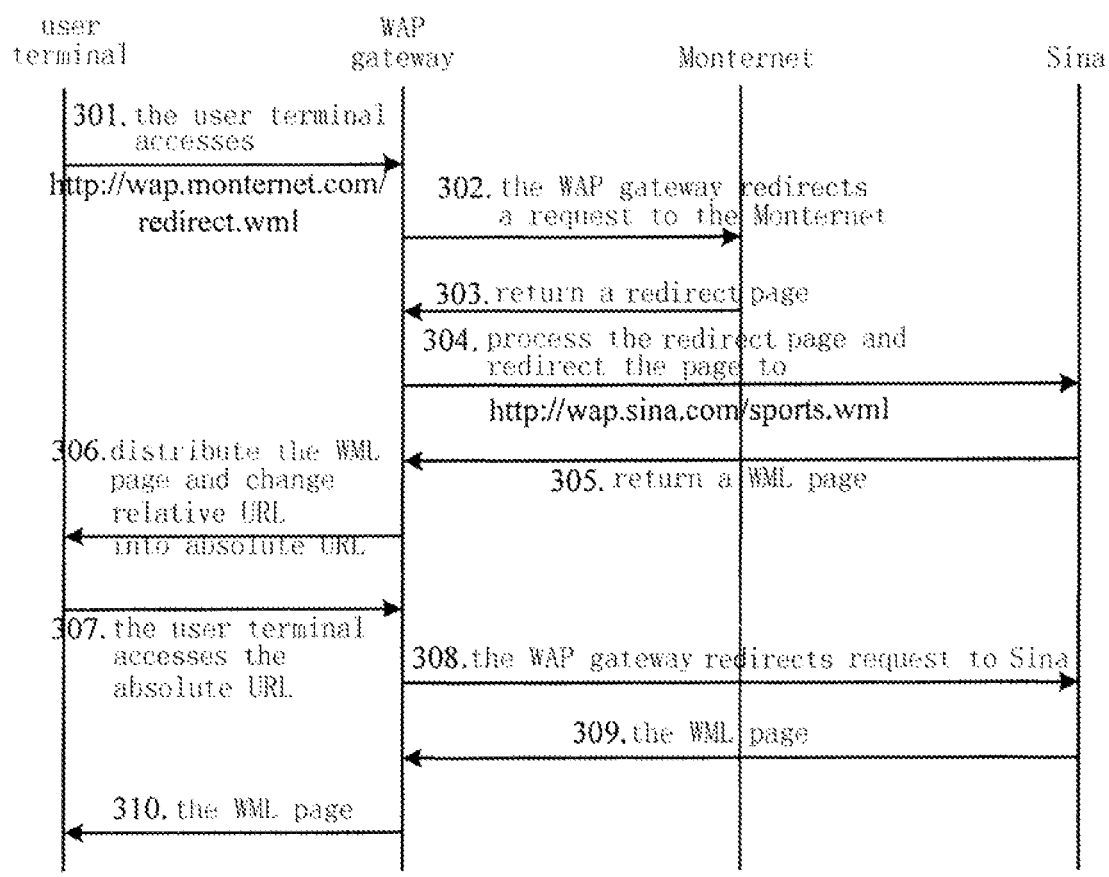
FIG. 3 is a schematic diagram illustrating a specific flow of a method for page redirection according to an embodiment of the present disclosure.

FIG. 3 is a schematic diagram illustrating a specific flow of a method for page redirection according to an embodiment of the present disclosure. This embodiment is an implementation of the embodiment as shown in FIG. 1. According to this embodiment, the WAP gateway further needs to change relative URL information in the page obtained after the redirection into absolute URL information.

In step 301, the user terminal initiates the page request to the WAP gateway, the URL of the page requested to be accessed is http://wap.monternet.com/redirect.wml.

In step 302, after the WAP gateway receives the page request, according to the URL information in the request it can be aware that the page requested by the user terminal is located in the Monternet. Therefore, the request is forwarded to the Monternet, to request acquisition of the page requested by the user terminal.

In step 303, the Monternet returns the redirected page. After the Monternet receives the page request forwarded by the WAP gateway, it can be aware that the page for which the user terminal expects to acquire has been changed into Sina. Therefore, the Monternet returns the redirect page to the WAP gateway, where the redirected page contains the information which needs to be redirected to http://wap.sina.com/sports.wml.

In step 304, after receiving the redirected page, the WAP gateway processes the redirected page. Specifically, after the WAP gateway receives the redirected page, by parsing the redirected page it can be aware that the page satisfies the page redirection criterion and needs to be redirected to http://wap.sina.com/sports.wml. Therefore, the WAP gateway rather than the user terminal performs the page redirection, and redirects the page to http://wap.sina.com/sports.wml.

In step 305, Sina returns the WML page to the WAP gateway.

In step 306, the WAP gateway determines whether the WML page returned by Sina contains the relative URL information; and if yes, the URL information is changed into the absolute URL information. According to this embodiment, the WML page returned by Sina contains the relative URL information: ./basketball.wml, and thus the WAP gateway needs to change the relative URL information into the absolute URL information, that is, to change ./basketball.wml into http://wap.sina.com/basketball.wml. Thereafter, the WML page in which the URL information has been changed is sent to the user terminal.

In step 307, the user terminal accesses the page specified by the absolute URL. That is, the user terminal initiates the page request to the WAP gateway, the URL of the page requested to be accessed is http://wap.sina.com/basksetball.wml.

In step 308, after the WAP gateway receives the page request, according to the URL information in the request it can be aware that the page requested by the user terminal is located in Sina. Therefore, the request is forwarded to Sina, to request acquisition of the page requested by the user terminal.

In step 309, Sina returns the requested WML page to the WAP gateway.

In step 310, after receiving the WML page returned by Sina, the WAP gateway returns the page to the user terminal.

Because there exists the relative URL in the page returned after the redirection, after the redirection in place of the user terminal, the WAP gateway needs to change the relative URL information into the absolute URL information, so as to ensure that the subsequent user terminal access can reach the accurate page.

Figure 4:
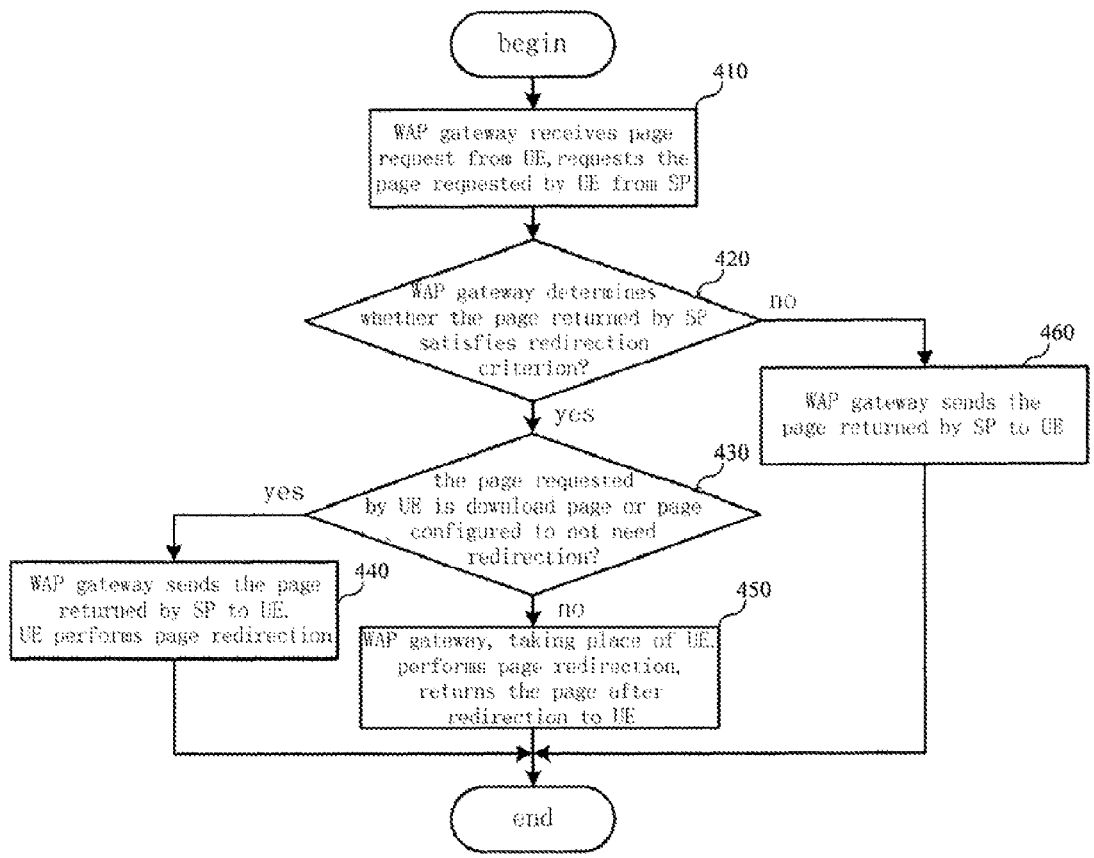
FIG. 4 is a schematic diagram illustrating a specific flow of a method for page redirection according to an embodiment of the present disclosure.

FIG. 4 is a schematic diagram illustrating a specific flow of a method for page redirection according to an embodiment of the present disclosure. On the basis of the embodiment as shown in FIG. 1, this embodiment further adds the step of determining whether the page requested by the user terminal is a download page or a page configured to not need the redirection.

Step 410 and step 420 are similar to step 110 and step 120, respectively, and are not repeated here for brevity.

If the WAP gateway determines that the page returned by the SP satisfies the page redirection criterion in step 420, the process proceeds to step 430; if not, the process proceeds to step 460.

In step 430, the WAP gateway determines whether the page requested by the user terminal is a download page or a page configured to not need the redirection; and if the page requested by the user terminal is a download page or a page configured to not need the redirection, the process proceeds to step 440; if the page requested by the user terminal is not a download page or a page configured to not need the redirection, the process proceeds to step 450.

Specifically, after the SP returns the page satisfying the page redirection criterion to the WAP gateway, according to the redirection information in the page the WAP gateway can determine whether the page requested by the user terminal is a download page or a page configured to not need the redirection. For example, when the page returned to the WAP gateway by the SP carries the information that is redirected to http://wap.sina.com/2.wml, according to the filename suffix of the redirected URL the WAP gateway can determine whether the page requested by the user terminal is a download page or a page configured to not need the redirection, and if the page requested by the user terminal is a download page or a page configured to not need the redirection, the process proceeds to step 440, where the page returned by the SP is directly sent to the user terminal and the page redirection is performed by the user terminal; if the page requested by the user terminal is not a download page or a page configured to not need the redirection, the process proceeds to step 450, where the WAP performs the page redirection rather than the user terminal, and returns the page obtained after the redirection to the user terminal Step 450 is similar to step 130.

If the WAP gateway determines that the page returned by the SP does not satisfy the page redirection criterion in step 420, the process proceeds to step 460, where the page returned by the SP is directly sent to the user terminal, so that the user terminal acquires the desired page. This step is similar to step 140.

The URL of the page obtained after the redirection is not consistent with that used when the user terminal initiates the page request. Therefore, according to this embodiment, the WAP gateway needs to determine whether the page requested by the user terminal is a download page or a page configured to not need the redirection, so as to solve the problem that the user terminal cannot identify the file when the page requested by the user terminal is a download page or a page configured to not need the redirection.

In addition, it shall be noted that in order to improve the efficiency of the WAP gateway determining whether the page requested by the user terminal is a download page or a page configured to not need the redirection, a black list and white list of URL list may be set in the WAP gateway, where the URL in the white list is the page which needs to be redirected by the WAP gateway in place of the user terminal, and the URL in the black list is the page which prohibits the WAP gateway from performing the redirection in place of the user terminal. In this case, a fuzzy matching is supported. Alternatively, black and white lists of the filename suffix of the redirected URL are set in the WAP gateway, where the filename suffix in the white list is the page which needs to be redirected by the WAP gateway, and the filename suffix in the black list is the page which prohibits the WAP gateway from performing the redirection in place of the user terminal. In this case, a complete matching is adopted.

Figure 5:
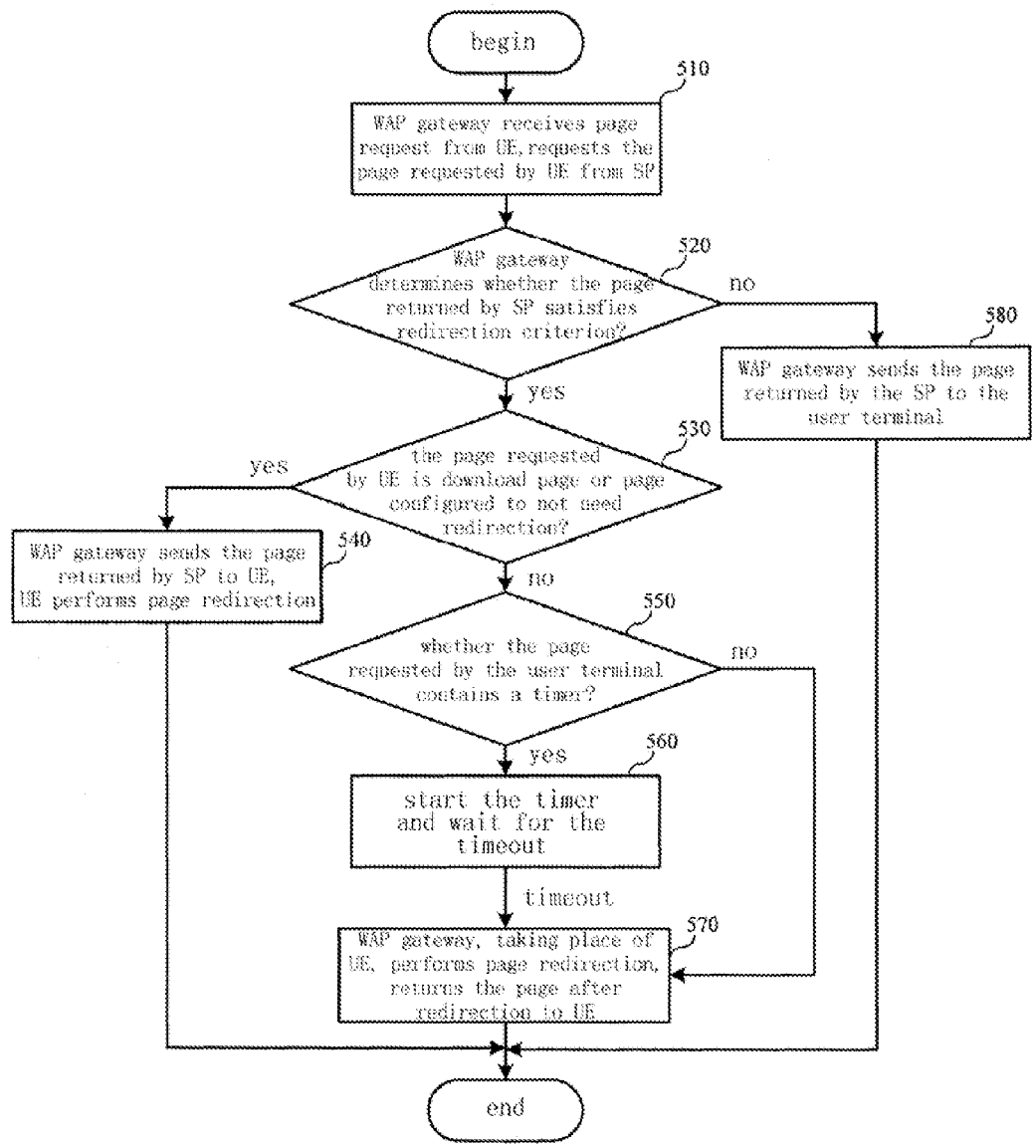
FIG. 5 is a schematic diagram illustrating a specific flow of a method for page redirection according to an embodiment of the present disclosure.

FIG. 5 is a schematic diagram illustrating a specific flow of a method for page redirection according to an embodiment of the present disclosure. On the basis of the embodiment as shown in FIG. 4, this embodiment further solves the problem of a timer in page redirection.

Step 510 to step 540 are similar to step 410 to step 440 entirely, and are not repeated here for brevity.

In step 550, the WAP gateway determines whether the page requested by the user terminal contains a timer. That is, after determining that the page requested by the user terminal is not a download page or a page configured to not need the redirection, the WAP gateway further needs to determine whether the page contains a timer, and if yes, the process proceeds to step 560; if not, the process proceeds to step 570.

In step 560, the WAP gateway starts the timer and waits for the timeout. This is because that if the page requested by the user terminal contains the timer, it indicates that the page requested by the use terminal needs to wait for a period of time before the redirection. Therefore, it is necessary for the WAP gateway to wait for the timeout of the timer before starting the page redirection, so as to ensure that the page requested by the user terminal can be successfully acquired.

After the timer times out or the WAP gateway determines that the page requested by the user terminal does not contain the timer, the process proceeds to step 570, where the WAP gateway, taking the place of the user terminal, performs the page redirection, and returns the page obtained after the redirection to the user terminal. This step is similar to step 450.

If the WAP gateway determines that the page returned by the SP does not satisfy the page redirection criterion in step 520, the process proceeds to step 580, where the page returned by the SP is directly sent to the user terminal, so that the user terminal acquires the desired page. This step is similar to step 460.

The sixth embodiment of the present disclosure relates to a method for page redirection and is similar to the fourth embodiment. The difference is as follows. According to the fourth embodiment, before performing the page redirection in place of the user terminal, the WAP gateway determines whether the page requested by the user terminal is a download page or a page configured to not need the redirection, and if the page requested by the user terminal is not a download page or a page configured to not need the redirection, the WAP gateway, taking the place of the user terminal, performs the page redirection; and if the page requested by the user terminal is a download page or a page configured to not need the redirection, the WAP gateway directly sends the page satisfying the page redirection criterion to the user terminal, the user may perform the page redirection by himself or herself, so as to solve the problem that the user terminal cannot identify the downloaded file. However, according to this embodiment, before the page obtained after the redirection is returned to the user terminal, the determination is made regarding whether the page is a download page or a page configured to not need the redirection, and if the page requested by the user terminal is not a download page or a page configured to not need the redirection, the page obtained after the redirection is returned to the user terminal; and if the page requested by the user terminal is a download page or a page configured to not need the redirection, the page satisfying the page redirection criterion is sent to the user terminal, and the user may perform the page redirection by himself or herself, to solve the problem that the user terminal cannot identify the download file.

This embodiment is described below by a specific example.

Figure 6:
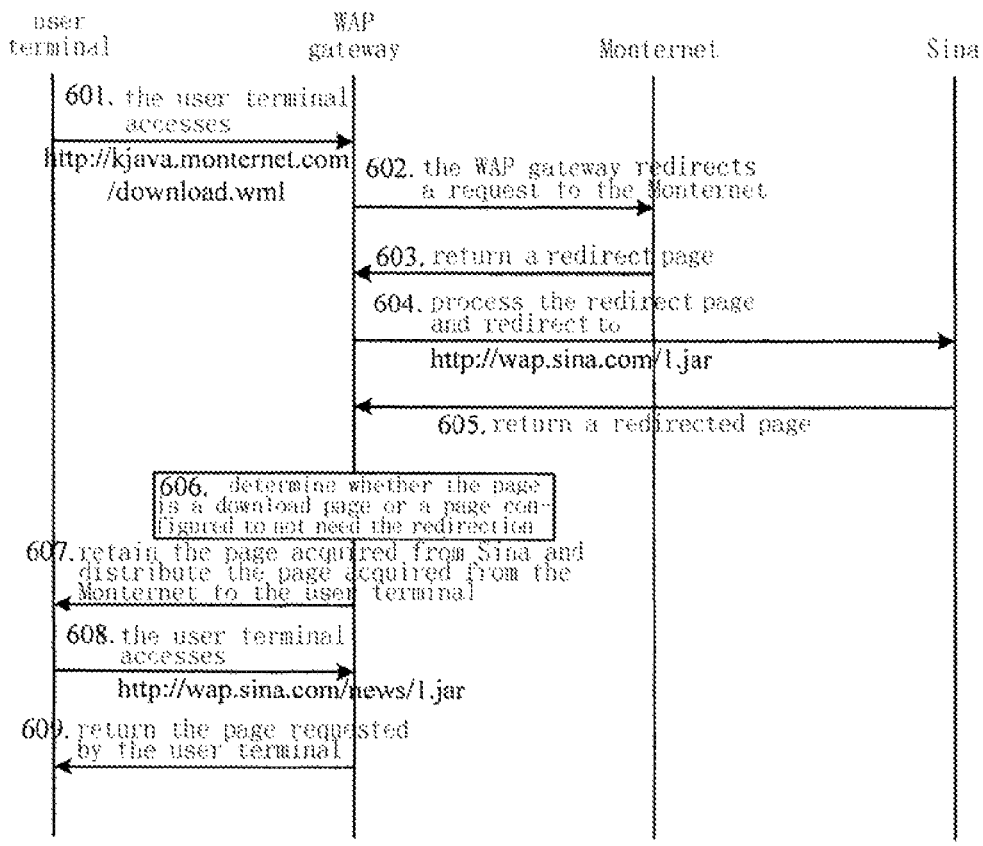
FIG. 6 is a schematic diagram illustrating a specific flow of a method for page redirection according to an embodiment of the present disclosure.

FIG. 6 is a schematic diagram illustrating a specific flow of a method for page redirection according to an embodiment of the present disclosure.

In step 601, the user terminal initiates the page request to the WAP gateway, the URL of the page requested to be accessed is http://kjava.monternet.com/download.wml.

In step 602, after the WAP gateway receives the page request, according to the URL information in the request it can be aware that the page requested by the user terminal is located in the Monternet. Therefore, the request is forwarded to the Monternet, to request acquisition of the page requested by the user terminal.

In step 603, the Monternet returns the redirected page which contains the link of the file to be downloaded. After the Monternet receives the page request forwarded by the WAP gateway, it can be aware that the page for which the user terminal expects to acquire has been changed into Sina. Hence, the Monternet returns the redirected page to the WAP gateway.

In step 604, after receiving the redirected page, the WAP gateway processes the redirected page. Specifically, after the WAP gateway receives the redirected page, by parsing the redirected page it can be aware that the page satisfies the page redirection criterion and needs to be redirected to http://wap.sina.com/1.jar. Therefore, the WAP gateway, taking the place of the user terminal, performs the page redirection, and redirects the page to http://wap.sina.com/1.jar.

In step 605, Sina returns the page redirected by the WAP gateway to the WAP gateway.

In step 606, after receiving the page returned by Sina, the WAP gateway determines whether the page is a download page or a page configured to not need the redirection. The WAP gateway can determine whether the page is a download page or a page configured to not need the redirection according to the Multimedia Internet Mail Extend (MIME) type of the page. If it is determined that the page is not a download page or a page configured to not need the redirection, the page obtained after the redirection is returned to the user terminal, and the flow ends. If it is determined that the page is a download page or a page configured to not need the redirection, the process proceeds to step 607. In this embodiment it is determined that the page is a download page or a page configured to not need the redirection, and thus the process proceeds to step 607.

In step 607, the WAP gateway retains the page acquired from Sina, and returns the redirect page acquired from the Monternet to the user terminal.

In step 608, after the user terminal receives the redirected page, by parsing the redirected page it can be aware that the page satisfies the page redirection criterion and needs to be redirected to http://wap.sina.com/1.jar. Therefore, the user terminal performs the page redirection and redirects the page to http://wap.sina.com/1.jar.

In step 609, after receiving the page redirection request from the user terminal, according to the URL in this request the WAP gateway can determine that this page has located in the WAP gateway, and can directly return the page to the user terminal.

In the method for page redirection according to the embodiment of the present disclosure, the WAP gateway may perform multiple page redirections, that is, through further redirection (a second redirection or even more redirections) after the page is obtained by the first redirection, the WAP gateway can eventually obtain the required page. In this case, after the first page redirection performed by the WAP gateway, the method further includes:

determining whether the page obtained after the page redirection performed by the WAP gateway satisfies the page redirection criterion, if not, sending, by the WAP gateway, the page which does not satisfy the page redirection criterion to the user terminal; and if yes, performing, by the WAP gateway, the page redirection continuously until the page obtained after the page redirection does not satisfy the page redirection criterion, and sending the page which does not satisfy the page redirection criterion to the user terminal.

Figure 7:
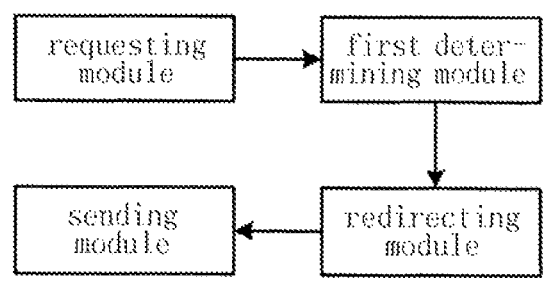
FIG. 7 is a schematic diagram illustrating a specific configuration of a WAP gateway according to an embodiment of the present disclosure.

FIG. 7 is a schematic diagram illustrating a specific configuration of a WAP gateway according to an embodiment of the present disclosure. The WAP gateway includes: a requesting module, configured to request, when receiving a page request from a user terminal, a page requested by the user terminal from a SP, and to receive the page returned by the SP; a first determining module, configured to determine, after the requesting module receives the page returned by the SP, whether the page returned by the SP satisfies the page redirection criterion; a redirecting module, configured to perform, in place of the user terminal, a page redirection when the first determining module determines that the page returned by the SP satisfies the page redirection criterion; and a sending module, configured to return the page obtained after the redirection by the redirecting module to the user terminal.

The page redirection criterion is that the page contains redirection serial status codes indicating that a redirection is needed, or that the page contains the "onenterforward" mark, so that the embodiment of the present disclosure is applicable not only for general pages but also for WML pages.

The WAP gateway according to this embodiment may further include a storing module, configured to retain "Cookie" information included in the page returned by the SP. When the requesting module needs to request an acquired page from the service provider, the requesting module requests the acquired page from the SP according to the "Cookie" information retained by the storing module, so that the page is successfully acquired.

The WAP gateway according to this embodiment may further include a URL information changing module, configured to change, when the page obtained after the redirection performed by the redirecting module contains relative URL information, the relative URL information into absolute URL information. The sending module returns the page in which the URL information has been changed to the user terminal, to prevent the problem that access may fail when the user terminal further accesses the redirected page.

The WAP gateway according to this embodiment may further include a second determining module, configured to determine whether a page requested by the user terminal is a download page or a page configured to not need the redirection. In addition, the sending module is further configured to send the page satisfying the page redirection criterion to the user terminal.

Specifically, the second determining module determines, when the first determining module determines the page satisfies the page redirection criterion, whether the page requested by the user terminal is a download page or a page configured to not need the redirection, and if the page requested by the user terminal is not a download page or a page configured to not need the redirection, the second determining module triggers the redirecting module; and if the page requested by the user terminal is a download page or a page configured to not need the redirection, the second determining module triggers the sending module to send the page satisfying the page redirection criterion to the user terminal. Or, the second determining module determines, after the redirecting module performs the redirection, whether a page requested by the user terminal is a download page or a page configured to not need the redirection, and if the page requested by the user terminal is not a download page or a page configured to not need the redirection, the second determining module triggers the sending module to return the page obtained after the redirection to the user terminal; and if the page requested by the user terminal is a download page or a page configured to not need the redirection, the second determining module triggers the sending module to send the page satisfying the page redirection criterion to the user terminal.

The URL of the page obtained after the redirection is not consistent with that used when the user terminal initiates the page request. Therefore, the WAP gateway needs to determine whether the page requested by the user terminal is a download page or a page configured to not need the redirection, so as to solve the problem that the user terminal cannot identify the file when the page requested by the user terminal is a download page or a page configured to not need the redirection.

To sum up, according to the embodiment of the present disclosure, the WAP gateway requests, when receiving the page request from the user terminal, the page requested by the user terminal from the SP, and when the page returned by the SP satisfies the page redirection criterion, the WAP gateway, taking the place of the user terminal, performs the page redirection, and returns the page obtained after the redirection to the user terminal. When the page requested by the user terminal needs to be redirected, the WAP gateway will perform the page redirection, rather than the user terminal initiating the page redirection. Such configuration may reduce air interface interaction between the WAP gateway and the user terminal, thereby reducing the time delay the terminal experiences when acquiring pages, so as to increase the customer satisfaction and to improve the efficiency of refreshing pages. Moreover, because the page redirection initiated by the user terminal needs to use a wireless network bandwidth and it is necessary for the user terminal to have the function of the page redirection, the page redirection performed by the WAP gateway rather than the user terminal can further reduce the use of the wireless network bandwidth, so as to lower the mobile comprehensive purchase cost, reduce the dependence on the user terminal and decrease complaints from the user.

The page redirection criterion is that the page contains redirection serial status codes indicating that a redirection is needed, or that the page contains the "onenterforward" mark, so that the embodiment of the present disclosure is applicable not only for general pages but also for WML pages.

The WAP gateway retains the "Cookie" information included in the page returned by the service provider, so that the page which has been requested to be acquired from the SP can be acquired successfully.

After the WAP gateway, taking the place of the user terminal, performs the page redirection, if the obtained page contains relative URL information, the relative URL information is changed into absolute URL information and is sent to the user terminal, to prevent the problem that access may fail when the user terminal further accesses the redirected page.

The URL of the page obtained after the redirection is not consistent with that used when the user terminal initiates the page request. Therefore, the WAP gateway needs to determine whether the page requested by the user terminal is a download page or a page configured to not need the redirection, so as to solve the problem that the user terminal cannot identify the file when the page requested by the user terminal is a download page or a page configured to not need the redirection.

While the present disclosure has been illustrated and described with reference to some preferred embodiments thereof, persons skilled in the art may appreciate that various modifications can be made in form and detail without departing from the spirit and scope of the present disclosure.

We claim:

1. In a gateway physically separate from a user terminal device and located in a network, a method for performing page redirection on behalf of the user terminal device serviced thereby, the method comprising:
   receiving, by the gateway, a page request that includes Uniform Resource Location (URL) information for a page requested from the user terminal;
   based on the received URL, sending, by the gateway, a page request with the URL to a service provider;
   receiving, by the gateway, a first page from the service provider according to the URL;
   identifying, by the gateway, that the first page returned by the service provider meets a redirection criterion on behalf of the user terminal;
   based on the identified redirection criterion met, parsing, by the gateway, the first page to determine URL information carried in the first page;
   performing, by the gateway, a page redirection via initiating a redirection page request to a redirection server to obtain a second page from the redirection server based on the determined URL information;
   sending the second page to the user terminal;
   retaining, by the gateway, "Cookie" information included in the first page;
   receiving, by the gateway, a page request carrying URL information from the user terminal;
   determining that the carried URL is directing to the service provider which returned the first page; and
   based on the determined URL directing to the service provider, correcting, by the WAP gateway, "Cookie" information carried in the page request according to the retained "Cookie" information;
   requesting a page from the service provider according to the corrected "Cookie" information and the URL directing to the service provider.

2. The method for page redirection according to claim 1, wherein the redirection criterion is a redirection serial status code indicating that a redirection is needed.

3. The method for page redirection according to claim 1, wherein the redirection criterion is contains an "onenterforward" mark.

4. The method for page redirection according to claim 1, wherein the method further comprises:
   determining that the second page contains relative URL information;
   based on the determined relative URL information, changing the relative URL information in the second page into absolute URL information; and
   returning the second page containing the absolute URL information to the user terminal.

5. The method for page redirection according to claim 1, wherein performing page redirection further comprises:
   subsequently determining that the page requested by the user terminal is a download page; and
   based on the subsequent determination, directly sending the first page satisfying the first page redirection criterion to the user terminal.

6. The method for page redirection according to claim 5, wherein the process of determining whether the page requested by the user terminal is a download page is based on a suffix name of the page requested by the user terminal.

7. The method for page redirection according to claim 1, wherein the method further comprises:
   subsequently determining that a second page requested for page redirection is a download page; and
   based on the subsequent determination, sending the first page to the user terminal.

8. The method for page redirection according to claim 7, wherein the determining that the second page is a download page based on a Multimedia Internet Mail Extend type of the second page.

9. The method for page redirection according to claim 1, wherein the method further comprises:
   determining that the first page contains a timer; and
   upon expiration of a time limit of the timer, performing the page redirection.

10. The method for page redirection according to claim 1, wherein the method further comprises:
    determining that the second page satisfies a second page redirection criterion; and
    based on the determination that the second page satisfies a second page redirection criterion, continuously performing subsequent page redirection until a page obtained does not meet one or more page redirection criterion, and
    sending the obtained page that does not meet one or more page redirection criterion to the user terminal.

11. A Wireless Application Protocol (WAP) gateway physically separate from a user terminal device and located in a network, the gateway comprising:
    a requesting module, configured to:
      receive a page request that includes Uniform Resource Location (URL) information for a page requested from the user terminal,
      based on the received URL, send a page request with the URL to a service provider, and
      receive a first page returned by the service provider according to the URL;
    a first determining module, configured to identify that the first page returned by the service provider satisfies a redirection criterion on behalf of the user terminal;
    a redirecting module, configured to, based on the identified redirection criteria met, parse the first page to determine URL information carried in the first page and perform a page redirection via initiating a redirection page request to a redirection server to obtain a second page from the redirection server based on the determined URL information;
    a sending module, configured to return a second page which is obtained based on the redirection by the redirecting module to the user terminal;
    a storing module, configured to retain "Cookie" information included in the first page returned by the service provider; and
    the requesting module further configured to:
      receive a page request carrying URL information from the user terminal,
      determine that the carried URL is directing to the service provider which returned the first page, and
      based on the determined URL directing to the service provider, correct "Cookie" information carried in the page request according to the "Cookie" information retained by the storing module, acquired request a page from the service provider according to the corrected "Cookie" information and the URL directing to the service provider.

12. The WAP gateway according to claim 11, wherein the redirection criterion is a redirection serial status code indicating that a redirection is needed.

13. The WAP gateway according to claim 11, wherein the first page redirection criterion is contains an "onenterforward" mark.

14. The WAP gateway according to claim 11, wherein:
the WAP gateway further comprises a URL information changing module, configured to change a relative URL information into absolute URL information when the second page contains the relative URL information; and
the sending module returns the second page in which the URL information has been changed to the user terminal.

15. The WAP gateway according to claim 11, wherein the WAP gateway further comprises:
a second determining module, configured to determine that the page requested by the user terminal is a download page; and
the sending module is further configured to send the first page satisfying the first page redirection criterion to the user terminal.

16. In a Wireless Application Protocol (WAP) gateway physically separate from a user terminal device and located in a network, a computer program product comprising computer executable instructions stored on a non-transitory computer readable medium that when executed by a processor cause the WAP gateway to perform the following page redirection on behalf of the user terminal device serviced thereby:

receiving, from the user terminal, a page request including Uniform Resource Location (URL) information for a page requested;
based on the received URL, sending the page request to a service provider;
receiving, from the service provider, a first page returned by the service provider according to the URL;
identifying that the first page returned by the service provider meets a redirection criteria on behalf of the user terminal;
based on the identified redirection criteria being met, parsing the first page to determine URL information carried in the first page;
performing a page redirection via initiating a redirection page request to a redirection server to obtain a second page from the redirection server based on the determined URL information;
sending the second page to the user terminal;
retaining "Cookie" information included in the first page;
receiving from the user terminal, a page request carrying URL information from the user terminal;
determining that the carried URL is directing to the service provider which returned the first page;
based on the determined URL directing to the service provider, correcting "Cookie" information carried in the page request according to the retained "Cookie" information; and
requesting an page from the service provider according to the corrected "Cookie" information and the URL directing to the service provider.

* * * * *